(12) United States Patent
Silsby

(10) Patent No.: US 11,161,649 B2
(45) Date of Patent: Nov. 2, 2021

(54) HANDLE

(71) Applicant: Pacific Market International, LLC, Seattle, WA (US)

(72) Inventor: Jacob D. Silsby, Seattle, WA (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 436 days.

(21) Appl. No.: 16/011,434

(22) Filed: Jun. 18, 2018

(65) Prior Publication Data

US 2019/0185211 A1    Jun. 20, 2019

Related U.S. Application Data

(63) Continuation-in-part of application No. 29/629,808, filed on Dec. 15, 2017, now Pat. No. Des. 866,251, and a continuation-in-part of application No. 29/629,808, filed on Dec. 15, 2017, now Pat. No. Des. 862,158.

(51) Int. Cl.
| | |
|---|---|
| *B65D 25/28* | (2006.01) |
| *A47J 45/06* | (2006.01) |
| *B65D 23/10* | (2006.01) |
| *A47J 41/00* | (2006.01) |
| *A47J 45/07* | (2006.01) |

(52) U.S. Cl.
CPC .......... *B65D 25/28* (2013.01); *A47J 41/0083* (2013.01); *A47J 45/067* (2013.01); *A47J 45/078* (2013.01); *B65D 23/106* (2013.01); *B65D 25/2844* (2013.01); *B65D 2525/287* (2013.01)

(58) Field of Classification Search
CPC ........ B65D 2525/286; B65D 2525/287; B65D 25/2861; B65D 25/2835; B65D 25/2864; B65D 23/10; B65D 23/104; B65D 23/106; A45C 13/30; A45C 2013/303; A45C 2013/306; A45F 2005/1013; A47J 45/06; A47J 45/067; A47J 45/07
USPC ....... 220/752, 762, 763, 764; 16/114.1, 405, 16/407, 406, 429, 427, 428
See application file for complete search history.

(56) References Cited

U.S. PATENT DOCUMENTS

| | | | | |
|---|---|---|---|---|
| 2,442,385 | A * | 6/1948 | Then .................. | B65D 25/2826 220/212.5 |
| 3,034,617 | A * | 5/1962 | Gehrle .................. | A45C 13/26 16/405 |
| 3,113,651 | A * | 12/1963 | Szabo .................... | A45C 13/22 16/405 |

(Continued)

OTHER PUBLICATIONS

Stanley Classic Folding Handle, 1 page, Stanley product publicly disclosed prior to Dec. 15, 2017.

(Continued)

*Primary Examiner* — Ernesto A Grano
*Assistant Examiner* — Javier A Pagan
(74) *Attorney, Agent, or Firm* — Davis Wright Tremaine LLP; George C. Rondeau, Jr.; Heather M. Colburn

(57) ABSTRACT

A handle including a connector portion with a through-slot and a biasing member. The through-slot defines a travel path. The biasing member is adjacent the through-slot and extends along the travel path. The through-slot is configured to receive a distal portion of an anchor. The biasing member is configured to bias the distal portion in a travel direction along the travel path.

7 Claims, 5 Drawing Sheets

(56) References Cited

U.S. PATENT DOCUMENTS

| | | | | |
|---|---|---|---|---|
| 3,340,971 A * | 9/1967 | Szabo | ................... | A45C 13/26 |
| | | | | 190/115 |
| 3,447,197 A * | 6/1969 | Szabo | ................... | A45C 13/26 |
| | | | | 16/405 |
| 3,479,702 A * | 11/1969 | Szabo | ................... | A45C 13/26 |
| | | | | 16/405 |
| 3,699,612 A * | 10/1972 | Hanley | ................. | A47B 95/02 |
| | | | | 16/405 |
| 3,795,941 A * | 3/1974 | Szabo | ................... | A45C 13/26 |
| | | | | 16/405 |
| 3,808,634 A * | 5/1974 | Szabo | ................... | A47B 95/02 |
| | | | | 16/405 |
| 6,032,334 A * | 3/2000 | Iima | ...................... | A45C 13/22 |
| | | | | 16/405 |
| D643,246 S | 8/2011 | Gilbert | | |
| 8,453,297 B2 * | 6/2013 | Wang | ................... | G06F 1/1616 |
| | | | | 16/114.1 |
| 9,415,901 B2 | 8/2016 | Beckman et al. | | |

OTHER PUBLICATIONS

Stanley Classic Compact Handle, 1 page, Stanley product publicly disclosed prior to Dec. 15, 2017.
Stanley Adventure Compact Handle, 1 page, Stanley product publicly disclosed prior to Dec. 15, 2017.
Information Disclosure Statement Transmittal filed Herewith.

* cited by examiner

HANDLE

CROSS REFERENCE TO RELATED APPLICATION(S)

This application claims the benefit of U.S. Design application Nos. 29/629,802, and 29/629,808, both of which were filed on Dec. 15, 2017, and both of which are incorporated herein by reference in their entireties.

BACKGROUND OF THE INVENTION

Field of the Invention

The present invention is directed generally to handles and more particular to handles used with beverage containers.

Description of the Related Art

Beverage containers like thermoses often have handles. Some of these handles are configured to move between storage and carrying positions. Therefore, a need exists for new handle designs. Handles configured to transition between storage and carrying positions are particularly desirable. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 2:
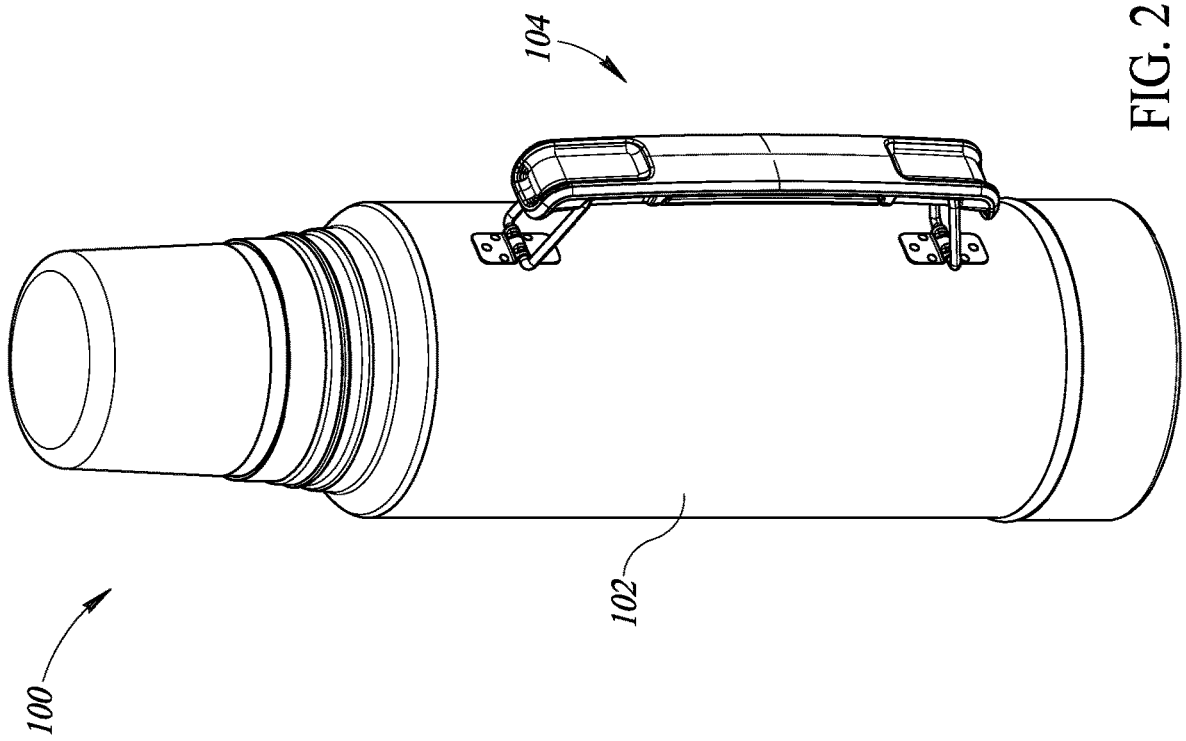
FIG. 2 is a perspective view of the beverage container with the handle assembly illustrated in a carrying configuration.
Figure 1:
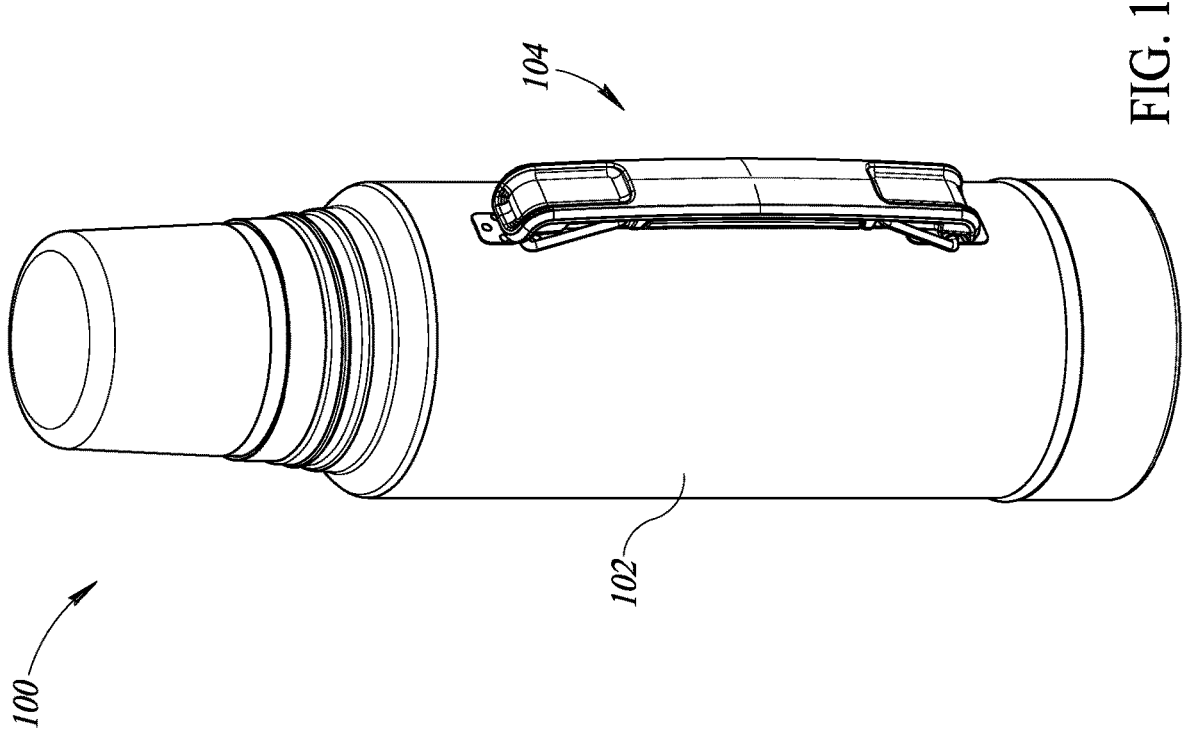
FIG. 1 is a perspective view of a beverage container with a handle assembly illustrated in a storage configuration.

FIGS. 1 and 2 illustrates a beverage container 100 having a sidewall 102 and a handle assembly 104 affixed to the sidewall 102. While the beverage container 100 has been illustrated as being a conventional thermos, this is not a requirement. The handle assembly 104 is selectively and manually transitionable from a storage configuration (see FIGS. 1 and 3) to a carrying configuration (see FIGS. 2 and 4) and vice versa. The handle assembly 104 may be characterized as being foldable from the carrying configuration (see FIGS. 2 and 4) into the storage configuration (see FIGS. 1 and 3).

Figure 3:
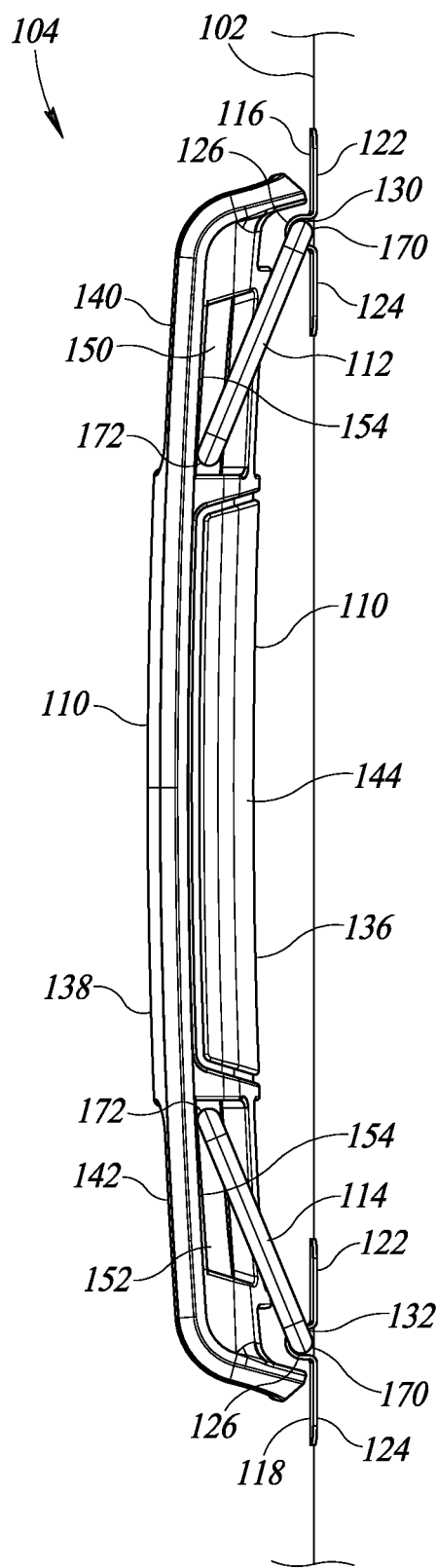
FIG. 3 is an enlarged side view of the handle assembly in the storage configuration.
Figure 4:
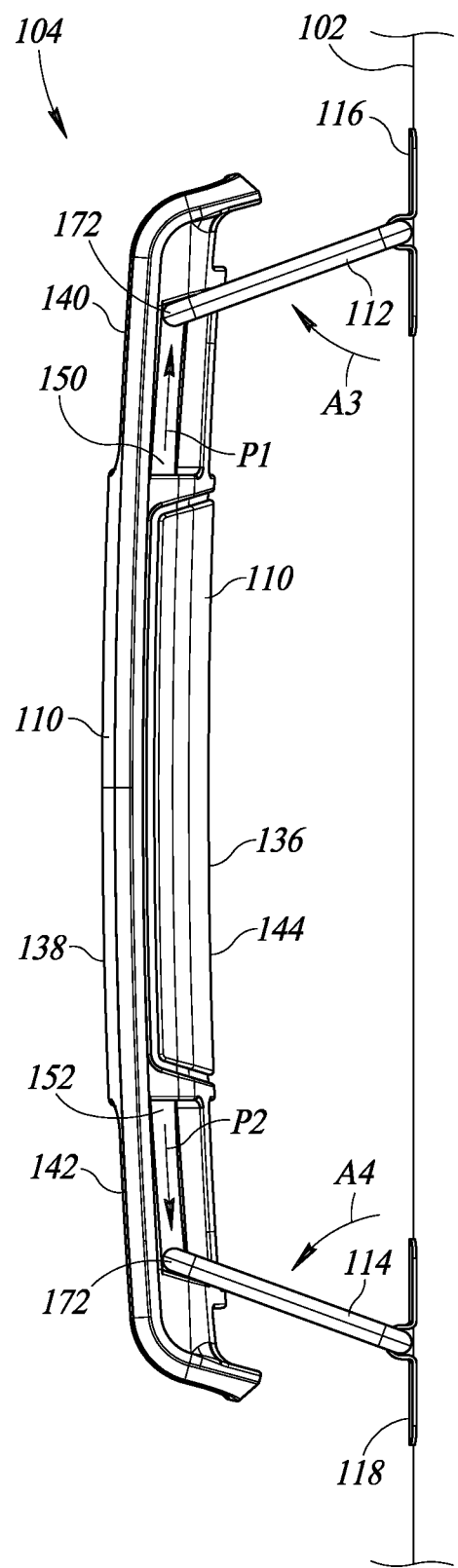
FIG. 4 is an enlarged side view of the handle assembly in the carrying configuration.
Figure 5:
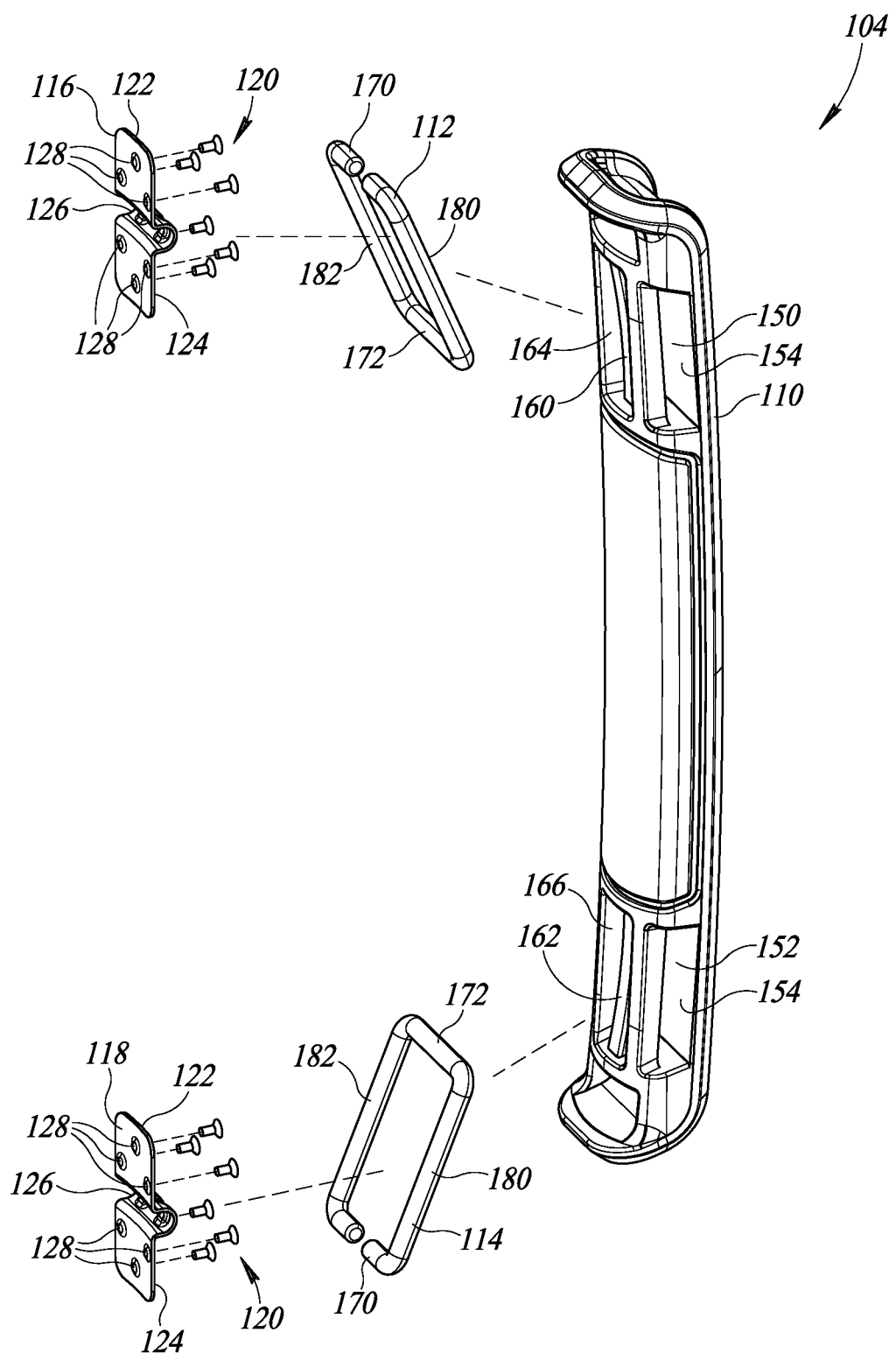
FIG. 5 is an exploded view of the handle assembly.

FIG. 5 is an exploded view of the handle assembly 104. As shown in FIG. 5, the handle assembly 104 includes a handle 110 and upper and lower anchors 112 and 114. Optionally, the handle assembly 104 may include upper and lower brackets 116 and 118. Referring to FIGS. 3 and 4, the upper and lower brackets 116 and 118 may each be affixed to the sidewall 102 by one or more fasteners 120 (see FIG. 5).

Referring to FIG. 3, in the embodiment illustrated, the upper and lower brackets 116 and 118 each include upper and lower portions 122 and 124. An intermediate portion 126 is positioned in between and interconnects the upper and lower portions 122 and 124. Referring to FIG. 5, the upper and lower portions 122 and 124 may each be substantially planar and may include one or more openings 128 configured to receive the fasteners 120. Referring to FIG. 3, in the embodiment illustrated, the upper and lower portions 122 and 124 are affixed to the sidewall 102 (e.g., by the fasteners 120 illustrated in FIG. 5). The intermediate portions 126 of the upper and lower brackets 116 and 118 may be bent or curved to define a U-shape. The intermediate portion 126 of the upper bracket 116 is spaced apart from the sidewall 102 and defines an upper gap 130 between the upper bracket 116 and the sidewall 102. Similarly, the intermediate portion 126 of the lower bracket 118 is spaced apart from the sidewall 102 and defines a lower gap 132 between the lower bracket 118 and the sidewall 102.

Handle

Referring to FIGS. 3 and 4, the handle 110 has an inner portion 136 facing toward the sidewall 102 and an outer portion 138 facing away from the sidewall 102. The handle 110 has an upper connector portion 140 opposite a lower connector portion 142. A handle grip 144 is positioned between the upper and lower connector portions 140 and 142. The handle grip 144 is configured to be gripped by a user.

The upper and lower connector portions 140 and 142 include laterally extending upper and lower through-slots 150 and 152, respectively. The upper and lower through-slots 150 and 152 are positioned between the inner and outer portions 136 and 138 of the handle 110. Referring to FIG. 4, the upper through-slot 150 defines a first travel path (identified by an arrow P1) for the upper anchor 112 and the lower through-slot 152 defines a second travel path (identified by an arrow P2) for the lower anchor 114. Referring to FIG. 3, each of the upper and lower through-slots 150 and 152 has an inner surface 154 that faces toward the sidewall 102.

Figure 6:
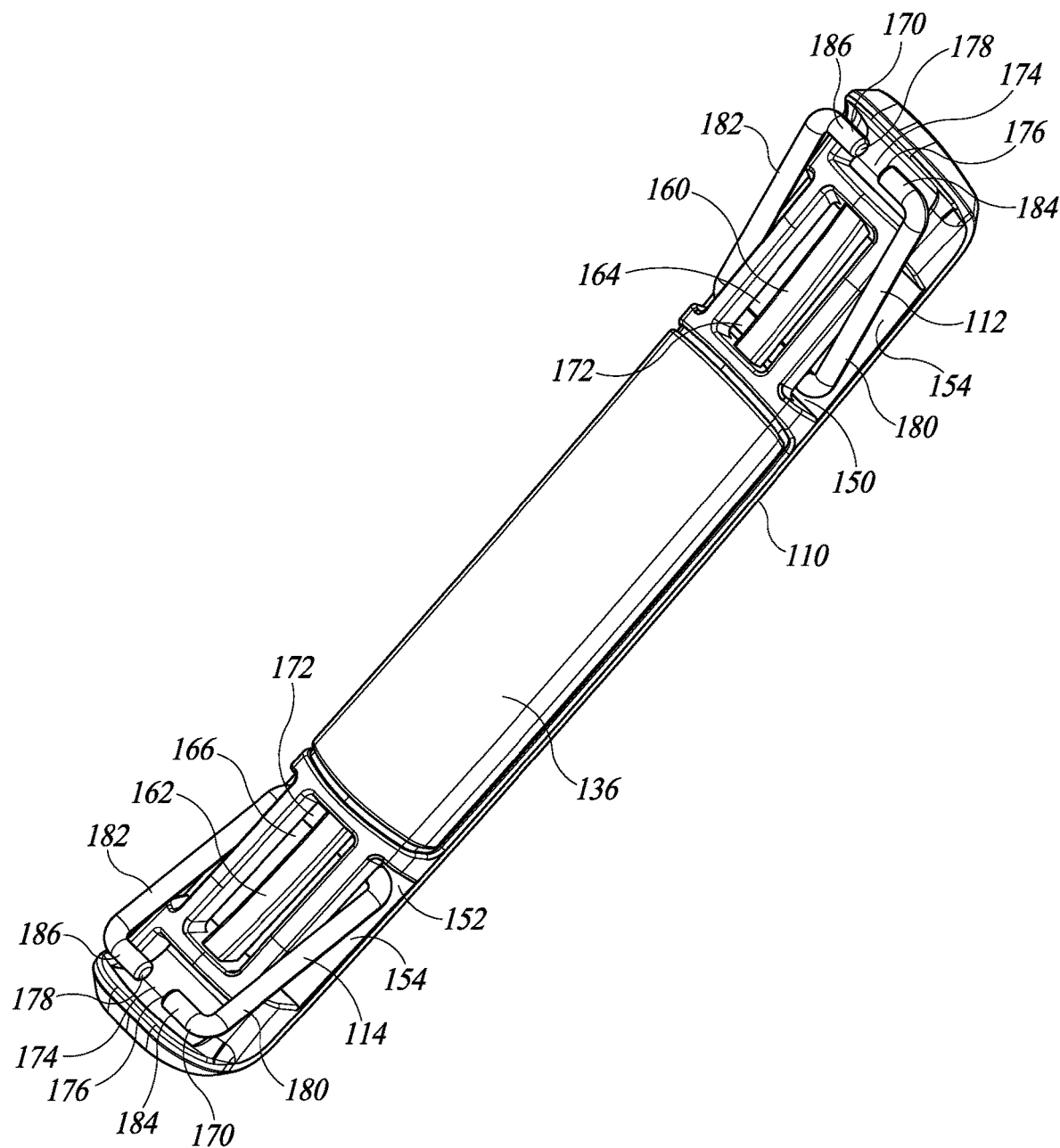
FIG. 6 is a perspective view of a handle and upper and lower anchors of the handle assembly illustrated in the storage configuration.
Figure 7:
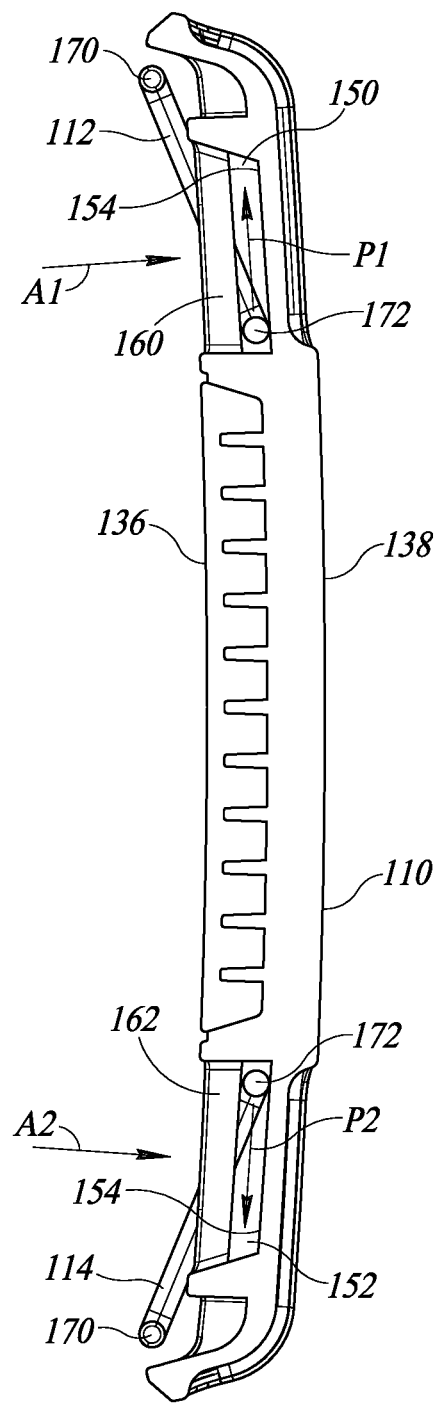
FIG. 7 is a cross-sectional view of the handle and the upper and lower anchors of the handle assembly illustrated in the storage configuration.

Referring to FIG. 7, the handle 110 includes one or more biasing members 160 and 162 that may each be implemented as a leaf spring. In the embodiment illustrated, the handle 110 includes the upper and lower biasing members 160 and 162, which extend outwardly into the upper and lower through-slots 150 and 152, respectively. The upper biasing member 160 extends along the first travel path (identified by the arrow P1) defined by the upper through-slot 150 and the lower biasing member 162 extends along the second travel path (identified by the arrow P2) defined by the lower through-slot 152. Referring to FIG. 6, in the embodiment illustrated, the biasing members 160 and 162 are positioned in upper and lower through-holes 164 and 166, respectively. The upper and lower through-holes 164 and 166 extend from the inner portion 136 of the handle 110 into the upper and lower through-slots 150 and 152, respectively. Thus, referring to FIG. 7, the upper biasing member 160 may flex within the upper through-hole 164 (see FIGS. 5 and 6) and the upper through-slot 150 along a first outward direction (identified by an arrow A1) and a first inward direction opposite the first outward direction. Similarly, the lower biasing member 162 may flex within the lower through-hole 166 (see FIGS. 5 and 6) and the lower through-slot 152 along a second outward direction (identified by an arrow A2) and a second inward direction opposite the second outward direction.

Upper and Lower Anchors

Referring to FIG. 5, the upper and lower anchors 112 and 114 are substantially identical to one another. In the embodiment illustrated, the upper and lower anchors 112 and 114 each have a generally rectangular outer shape. The upper and lower anchors 112 and 114 each have a proximal portion 170 opposite a distal portion 172.

The proximal portion 170 is connected to the beverage container 100 (see FIGS. 1 and 2). Referring to FIG. 3, the proximal portions 170 of the upper and lower anchors 112 and 114 are positioned inside the upper and lower gaps 130 and 132, respectively, defined between the sidewall 102 and the upper and lower brackets 116 and 118, respectively. Thus, the upper bracket 116 positions the proximal portion 170 of the upper anchor 112 at a first (upper) location on the sidewall 102 (see FIGS. 1-4). Similarly, the lower bracket 118 positions the proximal portion 170 of the lower anchor 114 at a second (lower) location on the sidewall 102 (see FIGS. 1-4). The proximal portions 170 of the upper and lower anchors 112 and 114 are configured to be rotatable inside the upper and lower gaps 130 and 132, respectively. Referring to FIG. 4, the upper anchor 112 rotates in a first rotation direction (identified by a curved arrow A3) when transitioning from the storage configuration (see FIGS. 1 and 3) to the carrying configuration (see FIGS. 2 and 4). The upper anchor 112 rotates in a second rotation direction opposite the first rotation direction when transitioning from the carrying configuration to the storage configuration. The lower anchor 114 rotates in a third rotation direction (identified by a curved arrow A4) when transitioning from the storage configuration (see FIGS. 1 and 3) to the carrying configuration (see FIGS. 2 and 4). The lower anchor 114 rotates in a fourth rotation direction opposite the third rotation direction when transitioning from the carrying configuration to the storage configuration.

Referring to FIGS. 3 and 4, the distal portions 172 of the upper and lower anchors 112 and 114 extend through the upper and lower through-slots 150 and 152, respectively, of the handle 110. Referring to FIG. 5, the upper and lower anchors 112 and 114 each have first and second side portions 180 and 182 that connect the proximal and distal portions 170 and 172 together. Referring to FIG. 6, in the embodiment illustrated, the proximal portion 170 includes a gap 174 that bifurcates the proximal portion 170 and defines confronting end portions 176 and 178. The first side portion 180 connects a first portion 184 of the proximal portion 170 to the distal portion 172 and the second side portion 182 connects a second portion 186 of the proximal portion 170 to the distal portion 172. The first portion 184 extends from the first side portion 180 to the first end portion 176. The second portion 186 extends from the second side portion 182 to the second end portion 178.

Referring to FIG. 5, by way of a non-limiting example, the upper and lower anchors 112 and 114 may each be formed by bending a rod or a wire to define the generally rectangular outer shape. For example, a first rod or wire may be inserted into the upper through-slot 150 of the handle 110. Then, the first rod or wire may be bent to define the distal portion 172 of the upper anchor 112. Next, the first rod or wire may be bent to define the first and second side portions 180 and 182 and the first and second portions 184 and 186 (see FIG. 6) of the proximal portion 170 of the upper anchor 112. Then, the first and second side portions 180 and 182 of the upper anchor 112 may be flexed outwardly away from one another to widen the gap 174 (see FIG. 6) and spread the end portions 176 and 178 (see FIG. 6) farther apart. When the end portions 176 and 178 (see FIG. 6) of the upper anchor 112 are sufficiently spaced apart, they may be inserted into the upper gap 130 (see FIG. 3). Then, the first and second side portions 180 and 182 of the upper anchor 112 may be allowed to return to their normal shape. Alternatively, referring to FIG. 3, before the upper bracket 116 is attached to the sidewall 102, the intermediate portion 126 of the upper bracket 116 may be positioned adjacent the distal portion 172 of the upper anchor 112. Then, the upper bracket 116 may be attached to the sidewall 102 trapping the distal portion 172 of the upper anchor 112 in the upper gap 130.

Similarly, referring to FIG. 5, a second rod or wire may be inserted into the lower through-slot 152 of the handle 110. Then, the second rod or wire may be bent to define the distal portion 172 of the lower anchor 114. Next, the second rod or wire may be bent to define the first and second side portions 180 and 182 and the first and second portions 184 and 186 (see FIG. 6) of the proximal portion 170 of the lower anchor 114. Then, the first and second side portions 180 and 182 of the lower anchor 114 may be flexed outwardly away from one another to widen the gap 174 (see FIG. 6) and spread the end portions 176 and 178 (see FIG. 6) farther apart. When the end portions 176 and 178 (see FIG. 6) of the lower anchor 114 are sufficiently spaced apart, they may be inserted into the lower gap 132 (see FIG. 3). Then, the first and second side portions 180 and 182 of the lower anchor 114 may be allowed to return to their normal shape. Alternatively, referring to FIG. 3, before the lower bracket 118 is attached to the sidewall 102, the intermediate portion 126 of the lower bracket 118 may be positioned adjacent the distal portion 172 of the lower anchor 114. Then, the lower bracket 118 may be attached to the sidewall 102 trapping the distal portion 172 of the lower anchor 114 in the lower gap 132.

By way of a non-limiting example, the upper and lower anchors 112 and 114 may each be implemented as a D-ring or similar structure.

Operation

Referring to FIG. 7, the arrow P1 (identifying the first travel path) indicates an upper first travel direction for the distal portion 172 of the upper anchor 112 when the handle assembly 104 transitions from the storage configuration (see FIGS. 1 and 3) to the carrying configuration (see FIGS. 2 and 4). On the other hand, the distal portion 172 of the upper anchor 112 travels in an upper second travel direction that is opposite the upper first travel direction when the handle assembly 104 transitions from the carrying configuration (see FIGS. 2 and 4) to the storage configuration (see FIGS. 1 and 3).

Similarly, the arrow P2 (identifying the second travel path) indicates a lower first travel direction for the distal portion 172 of the lower anchor 114 when the handle assembly 104 transitions from the storage configuration (see FIGS. 1 and 3) to the carrying configuration (see FIGS. 2 and 4). The distal portion 172 of the lower anchor 114 travels in a lower second travel direction that is opposite the lower first travel direction when the handle assembly 104 transitions from the carrying configuration (see FIGS. 2 and 4) to the storage configuration (see FIGS. 1 and 3).

When the user wishes to transition the handle 110 from the storage position (see FIGS. 1 and 3) to the carrying position (see FIGS. 2 and 4), the user pulls outwardly on the handle 110. The upper and lower biasing members 160 and 162 facilitate the handle 110 snapping outwardly and away from the sidewall 102 (see FIGS. 1-4). The upper biasing member 160 applies a first biasing force in the first outward direction (identified by the arrow A1) to the distal portion 172 of the upper anchor 112. The first biasing force biases the distal portion 172 of the upper anchor 112 toward the upper first travel direction (indicated by the arrow P1). At the same time, the lower biasing member 162 applies a second biasing force in the second outward direction (identified by the arrow A2) to the distal portion 172 of the lower anchor 114. The second biasing force biases the distal portion 172 of the lower anchor 114 toward the lower first travel direction (indicated by the arrow P2). Thus, when the user starts to move the handle 110 from the (folded) storage position (see FIGS. 1 and 3) to the (unfolded) carrying position (see FIGS. 2 and 4), the upper and lower biasing members 160 and 162 push the distal portions 172 of the upper and lower anchors 112 and 114, respectively, along the upper first travel direction (indicated by the arrow P1) and the lower first travel direction (indicated by the arrow P2), respectively. As the distal portions 172 of the upper and lower anchors 112 and 114 slide within the upper and lower through-slots 150 and 152, respectively, along the upper first travel direction (indicated by the arrow P1) and the lower first travel direction (indicated by the arrow P2), respectively, the proximal portions 170 of the upper and lower anchors 112 and 114 rotate in the upper and lower gaps 130 and 132, respectively, in the first and third rotation directions (identified by the curved arrows A3 and A4, respectively, in FIG. 4). As this occurs, the distal portions 172 of the upper and lower anchors 112 and 114 push the handle 110 outwardly causing the handle 110 to pop from the storage position (see FIGS. 1 and 3) to the carrying position (see FIGS. 2 and 4).

When the user wishes to transition the handle 110 from the carrying position (see FIGS. 2 and 4) to the storage position (see FIGS. 1 and 3), the user presses the handle 110 toward the sidewall 102 (see FIGS. 1-4) with sufficient force to overcome both the first and second biasing forces. This causes the distal portions 172 of the upper and lower anchors 112 and 114 to travel in the upper and lower second travel directions, respectively, which are opposite the upper and lower first travel directions indicated by the arrows P1 and P2, respectively. Thus, the distal portions 172 of the upper and lower anchors 112 and 114 slide within the upper and lower through-slots 150 and 152, respectively, in the upper and lower second travel directions, respectively. As the upper and lower anchors 112 and 114 move in these directions, the proximal portions 170 of the upper and lower anchors 112 and 114 rotate in the upper and lower gaps 130 and 132, respectively, in the second and fourth rotation directions (opposite the first and third rotation directions identified by the curved arrows A3 and A4, respectively, in FIG. 4). This movement pulls the handle 110 inwardly toward the sidewall 102 (see FIGS. 1-4) and places the handle 110 in the storage position. In this manner, the handle assembly 104 is folded from the carrying configuration (see FIGS. 2 and 4) into the storage configuration (see FIGS. 1 and 3).

The upper and lower biasing members 160 and 162 may help prevent the upper and lower anchors 112 and 114, respectively, from rattling because the upper and lower biasing members 160 and 162 continuously apply the first and second biasing forces, respectively, to the distal portions 172 of the upper and lower anchors 112 and 114, respectively. Thus, the distal portions 172 of the upper and lower anchors 112 and 114 are pressed against the inner surfaces 154 of the upper and lower through-slots 150 and 152, respectively. In the embodiment illustrated, the inner surface 154 of the upper through-slot 150 slopes toward the sidewall 102 (see FIGS. 1-4) along the first travel path in the upper first travel direction (indicated by the arrow P1) and the inner surface 154 of the lower through-slot 152 slopes toward the sidewall 102 along the second travel path in the lower first travel direction (indicated by the arrow P2).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A handle assembly comprising:
a handle manually positionable in a storage position and a different carrying position, the handle comprising first and second through-slots, first and second through-holes, and first and second biasing members, the first and second through-slots comprise first and second inner surfaces, respectively, the first and second through-slots defining first and second travel paths, respectively, the first and second through-holes extending into the first and second through-slots, respectively, the first biasing member being positioned in the first through-hole, extending into the first through-slot, and being movable with respect to the first inner surface, the second biasing member being positioned in the second through-hole, extending into the second through-slot, and being movable with respect to the second inner surface, the first and second biasing members extending along the first and second travel paths, respectively,
a first anchor having a first distal portion positioned inside the first through-slot, the first biasing member being configured to apply a first biasing force to the first distal portion, the first biasing force biasing the first distal portion in a first travel direction along the first travel path; and
a second anchor having a second distal portion positioned inside the second through-slot, the second biasing member being configured to apply a second biasing force to the second distal portion, the second biasing force biasing the second distal portion in a second travel direction along the second travel path, the handle being transitioned from the storage position to the carrying position by pulling on the handle, which causes the first distal portion to move in the first travel direction along the first travel path aided by the first biasing force and the second distal portion to move in the second travel direction along the second travel path aided by the second biasing force, the handle being transitioned from the carrying position to the storage position by pushing on the handle with sufficient force to overcome the first and second biasing forces, which causes the first distal portion to move in a third travel direction that is opposite the first travel direction along the first travel path and the second distal portion to move in a fourth travel direction that is opposite the second travel direction along the second travel path.

2. The handle assembly of claim 1, wherein the first anchor has a first proximal portion spaced apart from the first distal portion,
the first proximal portion is mountable at a first location,
the first anchor rotates about the first proximal portion when the first proximal portion is mounted at the first location and the first distal portion moves in the first or third travel directions,
the second anchor has a second proximal portion spaced apart from the second distal portion,
the second proximal portion is mountable at a second location, and
the second anchor rotates about the second proximal portion when the second proximal portion is mounted at the second location and the second distal portion moves in the second or fourth travel directions.

3. The handle assembly of claim 2 for use with a beverage container comprising the first and second locations, wherein when the first and second proximal portions are mounted at the first and second locations, respectively:
the first and second distal portions position the handle closer to the beverage container when the handle is in the storage position than when the handle is in the carrying position,
the first distal portion moves outwardly away from the beverage container as the first distal portion moves in the first travel direction and the first anchor rotates about the first proximal portion,
the first distal portion moves inwardly toward the beverage container as the first distal portion moves in the third travel direction and the first anchor rotates about the first proximal portion,
the second distal portion moves outwardly away from the beverage container as the second distal portion moves in the second travel direction and the second anchor rotates about the second proximal portion, and
the second distal portion moves inwardly toward the beverage container as the second distal portion moves in the fourth travel direction and the second anchor rotates about the second proximal portion.

4. The handle assembly of claim 1 for use with a beverage container, wherein the first anchor has a first proximal portion spaced apart from the first distal portion, the second anchor has a second proximal portion spaced apart from the second distal portion, and the handle assembly further comprises:
a first bracket configured to be mounted on the beverage container, a first gap being defined between the first bracket and the beverage container when the first bracket is mounted on the beverage container, the first proximal portion being positionable inside the first gap and rotatable therein as the first distal portion moves in the first or third travel directions; and
a second bracket configured to be mounted on the beverage container, a second gap being defined between the second bracket and the beverage container when the second bracket is mounted on the beverage container, the second proximal portion being positionable inside the second gap and rotatable therein as the second distal portion moves in the second or fourth travel directions.

5. The handle assembly of claim 1, wherein the first biasing member is a first leaf spring and the second biasing member is a second leaf spring.

6. The handle assembly of claim 5 for use with a beverage container, wherein the first anchor has a first proximal portion spaced apart from the first distal portion,
the second anchor has a second proximal portion spaced apart from the second distal portion,
the first and second proximal portions are mountable on the beverage container,
the first leaf spring extends along the first through-slot and presses the first distal portion against the first inner surface of the first through-slot,
the first inner surface being configured to face toward the beverage container when the first and second proximal portions are mounted on the beverage container,
the second leaf spring extends along the second through-slot and presses the second distal portion against the second inner surface of the second through-slot, and
the second inner surface being configured to face toward the beverage container when the first and second proximal portions are mounted on the beverage container.

7. The handle assembly of claim 6, wherein the first inner surface slopes toward the beverage container along the first travel direction when the first and second proximal portions are mounted on the beverage container, and the second inner surface slopes toward the beverage container along the second travel direction when the first and second proximal portions are mounted on the beverage container.

\* \* \* \* \*

UNITED STATES PATENT AND TRADEMARK OFFICE
CERTIFICATE OF CORRECTION

| | | |
|---|---|---|
| PATENT NO. | : 11,161,649 B2 | Page 1 of 1 |
| APPLICATION NO. | : 16/011434 | |
| DATED | : November 2, 2021 | |
| INVENTOR(S) | : Silsby | |

It is certified that error appears in the above-identified patent and that said Letters Patent is hereby corrected as shown below:

On the Title Page

Item (63) should read:
-- Continuation-in-part of application No. 29/629,802, filed on Dec. 15, 2017, now Pat. No. Des. 866,251, and a continuation-in-part of application No. 29/629,808, filed on Dec. 15, 2017, now Pat. No. Des. 862,158. --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*